May 10, 1966  P. MATTY  3,250,435
BEVERAGE DISPENSING SYSTEM MAINTAINING HEATED
AND POTABLE CONDITIONS
Filed April 9, 1964  3 Sheets-Sheet 2
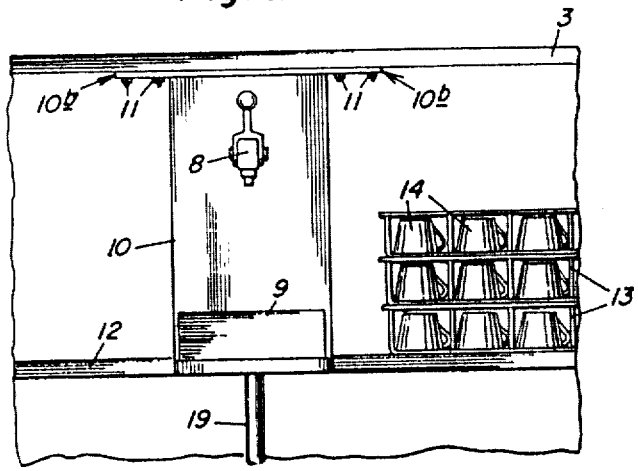
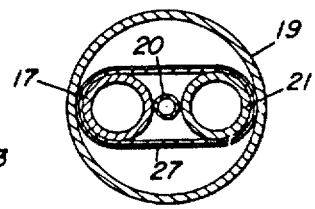
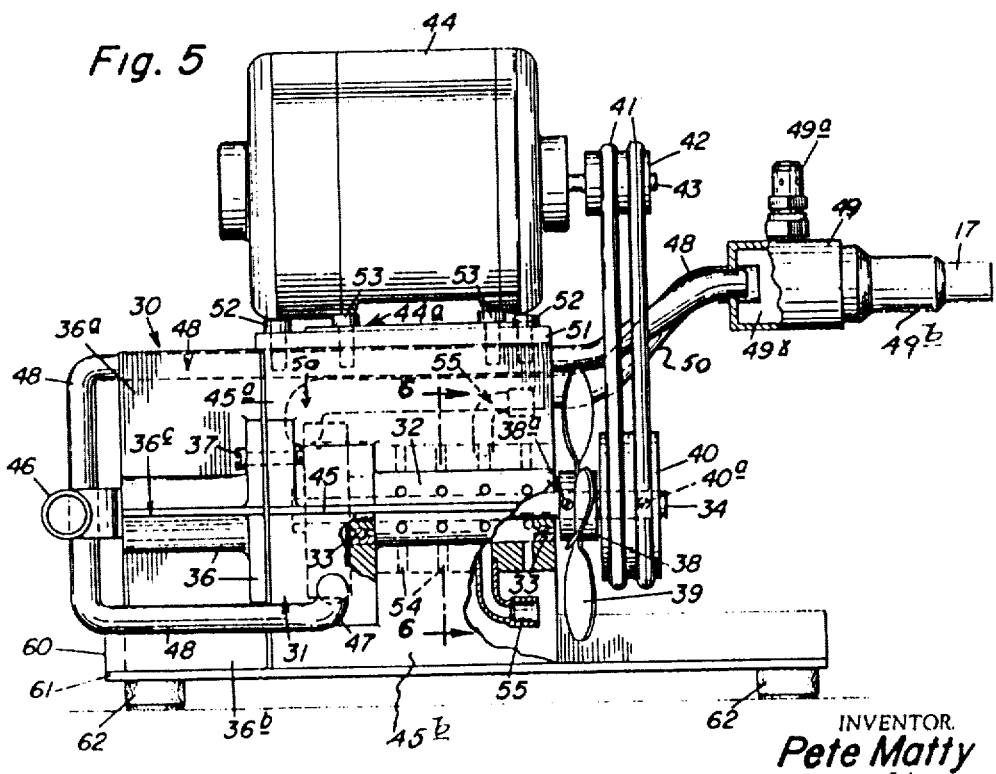
INVENTOR.
*Pete Matty*
BY Eugene E. Stevens
Raymond H. Stevens
ATTORNEYS INVENTOR.
*Pete Matty*
BY Eugene E. Stevens
Raymond H. Stevens
ATTORNEYS

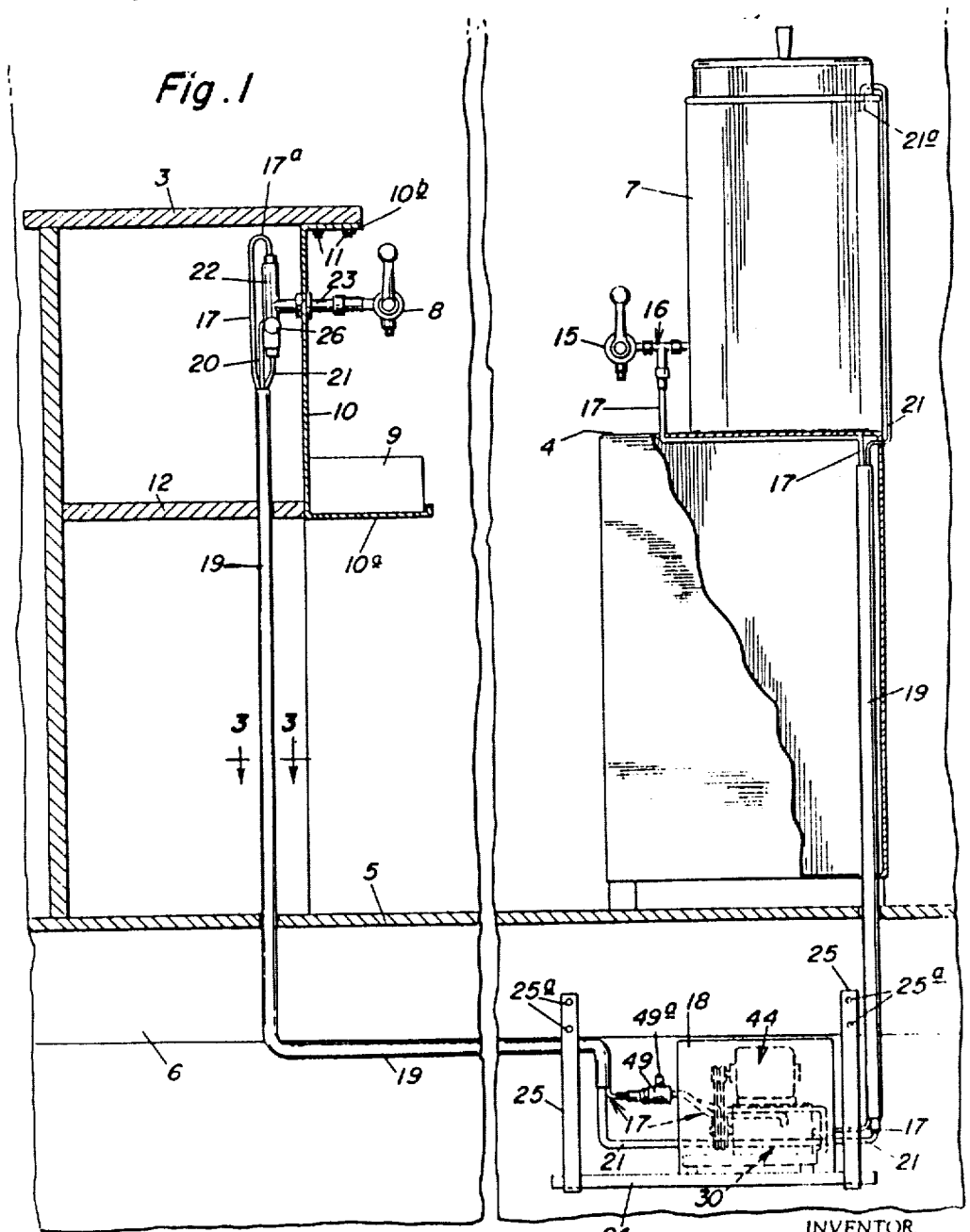

United States Patent Office 3,250,435
Patented May 10, 1966

3,250,435
BEVERAGE DISPENSING SYSTEM MAINTAINING HEATED AND POTABLE CONDITIONS
Pete Matty, P.O. Box 73, Middletown, Va.
Filed Apr. 9, 1964, Ser. No. 358,595
6 Claims. (Cl. 222—146)

My invention relates to improvements in beverage dispensing systems and apparatus incorporated therein. It has especial reference to hot beverages and particularly coffee, although not limited thereto.

Briefly and generally stated, the invention has among its primary objects (1) to provide a station or stations remote from the coffee urn where coffee can be dispensed expediously so that waitresses with loaded trays will not have to line up at the urn and await their turn; (2) to provide for the delivery of coffee at a proper predetermined temperature to a remote dispensing station (or stations) while avoiding undue pressure at the related dispensing faucet; and (3) to provide for continuous circulation of coffee or the like from the urn, or supply source, to a dispensing station and back to the urn so that the beverage will not become unpalatable as the result of remaining stagnant in the supply pipe during periods when very little or no beverage is being dispensed.

More specifically, it is an object of the invention to provide a novel thermostatically controlled means for maintaining the beverage at a proper temperature at the site of a remotely located dispensing faucet.

A further object is to provide a novel beverage-propelling pump which provides means for steam vapor escape so as to avoid objectional pressure build up in the piping leading from the pump.

Still another object is to provide novel means for preventing the pump from overheating, said means involving circulation of air through portions of the pump including that which provides the bearing for the impeller shaft.

Invention also resides in certain novel features of construction, combination and arrangement of the various elements which are incorporated in the system; and in modes of operation of same.

Various other objects and advantages of the system and apparatus which is incorporated therein will appear hereinafter, reference being had to the accompanying drawings which illustrate a now preferred example of the invention. However, the illustration is to be taken as illustrative rather than limitative because the invention is adaptable to other mechanical expressions within the spirit and scope of the subject matter claimed hereinafter.

In the drawings, wherein the same reference characters designate the same parts throughout the several views —

FIG. 1 is a broken view, partly diagrammatic and partly in section showing my system for dispensiing coffee at a station which is remote from the coffee urn or urns;

FIG. 2 is a fragmentary front view showing a coffee dispensing station in association with a counter, which latter has a shelf below its top for supporting trays of coffee cups, a remotely located coffee urn being also shown;

FIG. 3 is a cross sectional view taken on the line 3—3 of FIG. 1 showing the assembly of coffee supply and return pipes with an electric heating wire or coil and located within protective tubing;

FIG. 5 is a side elevational view of the motor and pump motor assembly of FIG. 4;

Figure 4:
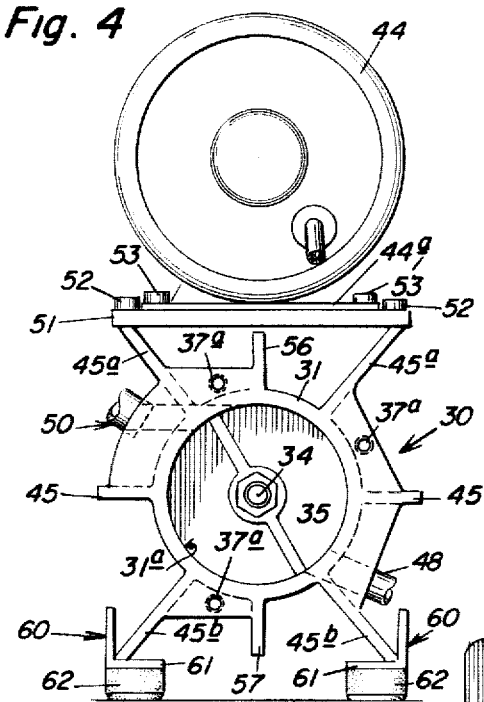
FIG. 4 is an end view of a coffee pump (with pump head removed) and drive motor assembly which is incorporated in the system.

Referring to the drawings by reference characters and turning to FIGS. 1, 2 and 3, numeral 3 indicates a service counter and 4 designates a second remotely located coffee urn-supporting counter which may, for instance, be in the restaurant kitchen. The counters 3, 4 are supported by the floor 5 which latter is sustained by the usual joists, one of which is indicatied at 6 in FIG. 1.

Hot coffee from the coffee container (not shown) of the urn 7 is piped through a pipe 17 from the usual brew outlet to the hereinafter to be described pump 30 in casing 18, which pump is incorporated in a gap in pipe 17. That portion of supply pipe 17 which receives coffee from the pump 30 of casing 18 (FIG. 1) delivers same to dispensing faucet 8 which is provided at service counter 3, and below the plane of the top of the latter.

Coffee is heated to a predetermined desired temperature during its passage to faucet 8; and there is a coffee return pipe 21 back to urn 7 from the region of faucet 8 —all as will be shortly described.

FIG. 1 shows that there is a drain pan 9 below the coffee dispensing faucet 8 of the service counter 3 and this drain pan is supported by the horizontal bottom 10a of a hanger unit 10 whose lateral upper end 10b is bolted as at 11 to the under surface of the top of counter 3.

The service counter 3 will preferably have a horizontal shelf 12 below its top; and this shelf, as shown in FIG. 2, will conveniently support a plurality of stacked cup holding baskets 13 for coffee cups 14. This arrangement enables waitresses with food laden trays to readily pick up a coffee cup and fill it from the faucet 8. A conventional cream dispenser may, of course, be located on top of the counter 3 adjacent the site of the coffee dispensing faucet 8.

Referring back to the coffee urn 7, FIG. 1 shows it as having a dispensing faucet 15 as usual. However, faucet 15 is carried by one head end of a T-fitting 16 which is connected to the urn-provided coffee outlet while the other end of said T-fitting head carries the urn faucet 15. The stem of the T-filling 16 has connected thereto the earlier mentioned coffee supply pipe 17 for the service counter faucet 8.

As herein shown, both the supply pipe 17 and the incidentally mentioned return pipe 21 extend below the floor 5 and lengths of both at opposite sides of the pump and motor enclosing casing 18 extend through lengths of protective insulation casing 19.

The heretofore mentioned pump and motor enclosing casing 18 is located below floor 5 and supported by a shelf 24 which is suspended by suitable hangers 25 that are bolted (25a) to one of the flooring joists 6.

In order to assure proper predetermined coffee temperature at the one or more service counter faucets 8, I provide one or several elongated electric heating coils or hot wires 20 in the protective supply and return pipe-receiving casing sections 19. The heating of wires or coils 20 is controlled by the thermostat 26 which is carried by the faucet 8 providing header 22 into which the downturned end 17a of supply pipe 17 discharges.

Faucet 8 is carried by branch pipe 23 of header 22; and the back-to-urn 7 coffee return pipe 21 leads from the lower end of header 22. Coffee from return pipe 21 discharges into the urn top as indicated at 21a in FIG. 1.

So as to maintain close engagement of the supply pipe 17 and return pipe 21 with the heating wire or coil 20, I provide the insulation material, or other, binding 27. Thus, 17, 20, 21 are held assembled as a unit within the protective casing 19, as indicated in FIG. 3.

3

Thus, it will be clear that hot coffee will always be available at the service counter faucet (or faucets) 8; and in this connection it is to be understood that means (to be hereinafter described) will be employed, in addition to header 22, to prevent objectionably high pressure discharge of coffee from the service counter faucet 8.

Also, it will be apparent that there is a continuous circuit of hot coffee from the urn 7 to service counter faucet 8 and back to the urn for so long as the hereinafter described motor driven pump 30 is in operation.

The pump unit employed

Turning now to FIGS. 4 and 5, the pump 30 includes a casting which provides the pump casting portion 31 and the adjacent impeller shaft bearing-providing portion or sleeve 32 which latter is open at one end. In FIG. 4 the pump head 36 of FIG. 5 has been removed to expose an impeller 35 fast on driven shaft 34 and within the impeller chamber 31a of pump casting portion 31. Bearings 33 for impeller shaft 34 and within casting portion 32 are shown in FIG. 5. The impeller is of the general character shown, for example, in applicant's U.S. Letters Patent 3,085,880 issued April 16, 1963.

Machine screws 37 secure the pump head 36 to the impeller chamber-providing end of pump casting portion 31. Also to be noted is the fact that pump head 36 is provided, adjacent each side, with the upper and lower outwardly inclined heat disseminating fins 36a, 36b, respectively; and further that each side has a horizontal outwardly extending fin 36c. The respective heat disseminating fins 36a, 36b, 36c of pump head register with corresponding longitudinally extending fins 45a, 45b and 45 of pump casting 31, 32 as indicated in FIG. 5.

Air cooling of pump and its shaft bearings

To prevent the pump 30 and the bearings 33 of motor driven impeller shaft 34 from overheating, air blast delivering means is provided in addition to the registering pump casting and pump head-provided heat disseminating fins 36a, 45a; 36b, 45b; and 36a, 45 of FIG. 5.

In carrying out this phase of the invention, the end of the driven impeller shaft 34 which projects beyond the open outer end of pump portion 32 has fast thereon the hub 38 of the fan 39. This fan 39 is located inwardly of the twin pulley unit 40. Set screws 38a, 40a secure fan and pulley hubs to shaft 34. Impeller shaft 34 is driven by adjacent belts 41 from the pulley unit 42 of the armature shaft 43 of the superjacent electric motor 44, said belts 41 being turned about impeller shaft pulleys 40.

Thus, when impeller shaft 34 is driven, the fan 39 delivers a blast of air toward pump portion 31. Some of this air blast passes outwardly of pump portion 32 and some is delivered directly into the latter through its open outer end. Also one or more tubes 55 which communicate into pump portion 32 have open outer ends opposed to fan 39 for further delivering air into pump portion 32. Air delivered into pump portion 32 ultimately escapes through the plurality of apertures 54 indicated in FIG. 5.

FIGS. 4 and 5 show the base 44a of motor 44 as secured by machine screws 53 to a plate 51. This plate 51, as indicated, is detachably fastened by machine screws 52 to the upper ends of the fins 45a of the pump casting portions 31, 32.

Operation of pump 30 and system

The particular form and construction of the pump 30 is very important for a number of reasons. Firstly, fan 39 and pump casting-provided fins enable it to handle very hot liquid without overheating. Secondly, it provides convenient detachable support for motor 44. Thirdly, because it incorporates means for preventing the discharge of steam or vapor into the coffee line 17 leading to the header 22 of FIG. 1 and to the faucet or faucets 8 for dispensing the coffee at the service counter 3.

Figure 7:
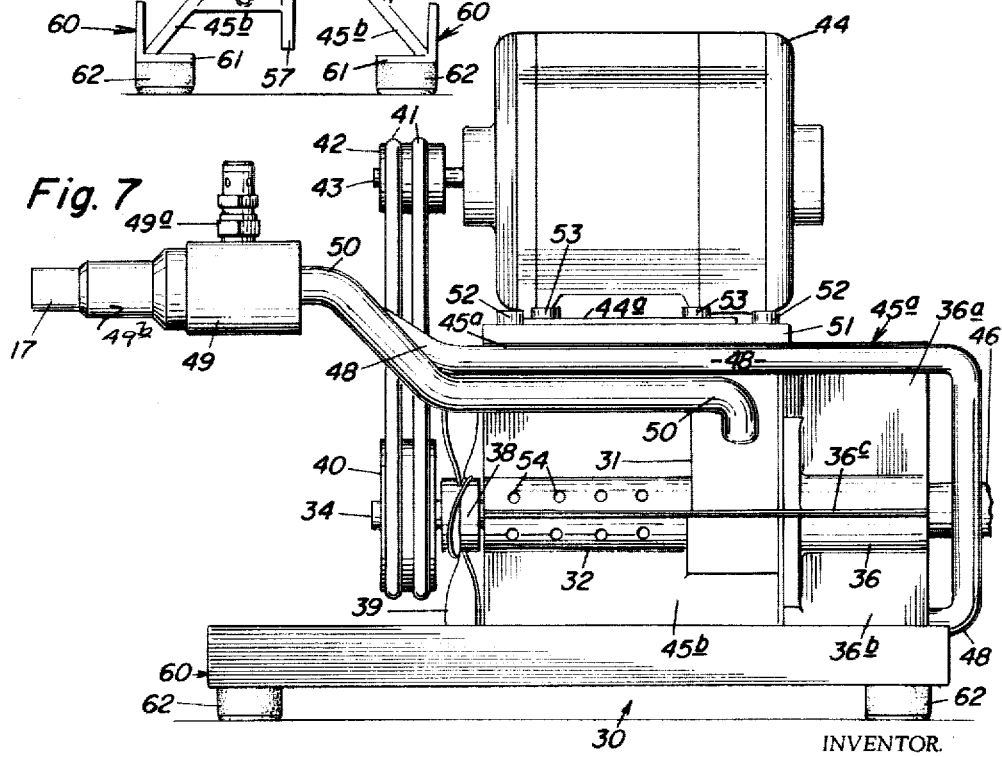
FIG. 7 is a side elevational view of the opposite side of the unit from that shown in FIG. 5.

In carrying out the above noted third phase of the invention, FIGS. 5 and 7 show that hot coffee from the urn-supplied pipe 17 is delivered to the pump 30 through the elbow 46. This elbow 46 discharges through pump head 36 axially into the impeller chamber 31a (FIG. 4). Also to be noted is the fact that the coffee outlet from the impeller chamber 31a is located adjacent the bottom of the latter and discharges through the elbow 47 and the pipe 48 into the chamber 49x of a syphon unit 49 due to rotation of the impeller in a clockwise direction as observed in FIG. 4 where fluid entering axially into the impeller chamber 31a (note the head 36 of FIG. 5 has been removed in FIG. 4) will be centrifugally discharged by the impeller out of the line 48 in FIG. 4.

Since coffee in pipe 17 is heated (20) en route to pump 30, there will be some steam vapor in the impeller chamber 31a and it is, of course, very desirable to have this steam vapor be not mixed with the coffee that is to be delivered into the faucet 8 or faucets 8 of the service counter 3. Therefore, I provide the impeller chamber 31a with the vapor outlet pipe 50 which leads alongside the pump and motor unit and discharges into the chamber 49x of the syphon unit 49. Thus, any steam delivered to syphon unit chamber 49x escapes to the atmosphere through the syphon unit-carried relief valve 49a. This means that steamless coffee will be delivered from the syphon chamber outlet 49b to that portion of supply pipe 17 which leads to service counter 8.

Figure 6:
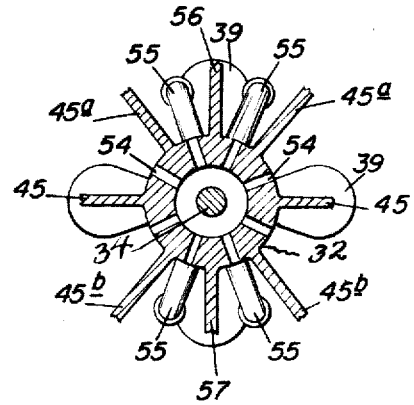
FIG. 6 is a partly broken cross-sectional view taken on the line 6—6 of FIG. 5.

The pump 30 and, preferably also, its head 36 have vertical top and bottom heat disseminating fins 56, 57, respectively. Such fins 56 and 57 of the pump and of the head when used will be aligned and are located between the respective pairs of outer top and bottom fins 45a, 36a and 45b, 36b, as will be understood from FIGS. 4, 5 and 6. Also, thickened portions of the impeller chamber-providing end of pump 30 have tapped holes 37a (FIG. 4) for receiving the previously mentioned head-securing screws 37.

The lower edges of the diverging lower fiins 45b, 36b of the pump 30 and head 36 are secured by suitable machine screws or the like to the horizontal flanges 61 of angle bars 60 as indicated in FIGS. 5 and 7. FIGS. 4, 5 and 7 show suitable supporting feet 62 secured to the undersurface of flanges 61 of angle bars 60.

Having thus described my invention what I claim therefor is:

1. A system for dispensing a heated beverage with a minimum of gas vapor entrained therein and in a potable condition, comprising in combination, beverage supply means including conduit means providing inlet and outlet portions; power-operated pump means including an inlet portion connected to said conduit means for receiving the beverage from said supply outlet portion; said pump means including an impeller chamber communicating with the inlet portion of said pump means and including an outlet and an impeller for directing the beverage from said impeller chamber outlet under pressure; vapor pressure relief means connected to said impeller chamber and including means for automatically relieving vapor pressure accumulating in said impeller chamber; remote header means connected in series to said supply inlet portion and said impeller chamber outlet; dispensing valve means connected to said remote header means for dispensing the beverage; said remote header means including a thermostatic control thereon for sensing the temperature of said beverage at said header means; and heating coil means adjacent said conduit means containing the beverage, said heating coil means being operatively connected to and controlled by said thermostatic control means.

2. The system as claimed in claim 1 in which said vapor-pressure relief means comprises a syphon unit connected to said impeller chamber outlet, conduit means connecting an upper portion of said impeller chamber to said syphon unit, and relief valve means connected to said syphon unit for permitting vapor to escape from said syphon unit.

3. The system as claimed in claim 1 in which said power-operated pump means includes a casing including said impeller chamber, an operating shaft journaled axially within said casing and terminating in said impeller chamber, said impeller means being mounted on the shaft terminating in said impeller chamber, said pump means inlet portion being disposed axially of said shaft, said impeller chamber outlet being disposed in an outer marginal portion of said impeller chamber, said impeller chamber including an upper vapor outlet portion connected to said vapor chamber relief means.

4. The system as claimed in claim 3 in which said casing includes a plurality of integral, heat-conducting fins extending outwardly of said casing and spaced circumferentially about the axis of rotation of said operating shaft, and fan blade means secured to said shaft exteriorally of said housing for forcing convection current across the outer surface of said fins and obviating the accumulation of vapor in said impeller chamber.

5. The system as claimed in claim 4 in which certain of said fins comprise mounting means for said casing, an electrically energized motor mounted on other of said fins, and drive means connected between said motor and said operating shaft.

6. The system as claimed in claim 4 in which said casing includes a removable head forming one side of said impeller chamber and including the pump means inlet portion, said casing including an apertured sleeve surrounding an intermediate portion of said operating shaft, bearings in said sleeve in which said shaft is journaled, and tube means including an inlet portion opening toward said fan blade means and communicating with the interior of said sleeve.

References Cited by the Examiner
UNITED STATES PATENTS

| | | | |
|---|---|---|---|
| 1,440,808 | 1/1923 | Wineman | 103—113 |
| 2,104,045 | 1/1938 | Knopp | 219—301 |
| 2,369,440 | 2/1945 | Curtis | 222—318 |
| 2,680,802 | 6/1954 | Bremer et al. | 222—146 X |
| 2,726,017 | 12/1955 | Burden | 222—318 X |

LOUIS J. DEMBO, *Primary Examiner.*

ROBERT B. REEVES, *Examiner.*

F. R. HANDREN, *Assistant Examiner.*